United States Patent
Aubry et al.

[11] Patent Number: 5,462,137
[45] Date of Patent: Oct. 31, 1995

[54] GYROPLANE ROTOR BRAKING UNIT

[75] Inventors: Jacques A. Aubry, Cabries; Michel R. Bonfils, St. Cannat, both of France

[73] Assignee: Aerospatiale Societe Nationale Industrielle, France

[21] Appl. No.: 319,471

[22] Filed: Oct. 4, 1994

Related U.S. Application Data

[63] Continuation of Ser. No. 972,241, Nov. 5, 1992, abandoned.

[30]    Foreign Application Priority Data

Nov. 7, 1991 [FR] France ................ 91 13741

[51] Int. Cl.⁶ .................................................. B64C 27/32
[52] U.S. Cl. ................................. 188/72.6; 244/110 R
[58] Field of Search .................. 188/2 D, 368,
   188/369, 370, 72.4, 72.6, 71.6, 71.8, 264 G;
   416/169 R; 244/110 R, 110 H, 110

[56]              References Cited

U.S. PATENT DOCUMENTS 3,185,263  5/1965  Schanz et al. .................. 188/72.6
4,248,329  2/1981  Torigde ........................... 188/72.4
4,257,496  3/1981  Fujita et al. ..................... 188/72.6
4,290,507  9/1981  Brown ............................. 188/72.6
4,306,635  12/1981 Mitchell .......................... 188/72.4
4,719,497  1/1988  Tsuruta ............................ 188/72.6
4,798,052  1/1989  McAfee ............................. 60/572
5,000,295  3/1991  Fargier ............................ 188/72.1

FOREIGN PATENT DOCUMENTS 0206447  12/1986  European Pat. Off. .
 286504  10/1988  European Pat. Off. .
  76374   4/1961  France .
2165902   4/1986  United Kingdom .............. 188/72.4

Primary Examiner—Matthew C. Graham

[57]              ABSTRACT

For braking a gyroplane rotor, a unit is proposed which comprises a disk brake equipped with a hydraulic actuator (26), which is integrated and has force amplification, as well as a mechanical transmission (54) connecting a control member such as a handle or lever (52) to the said actuator. The amplification effect is obtained by the section difference between a control piston (34) of the actuator directly connected to the mechanical transmission and a free piston (28) of the actuator by which the braking force is exerted.

11 Claims, 3 Drawing Sheets

GYROPLANE ROTOR BRAKING UNIT

This application is a continuation of application Ser. No. 07/972,241, filed Nov. 5, 1992, now abandoned.

BACKGROUND OF THE INVENTION

1. Field of the Invention

The invention relates to a braking unit for use on a gyroplane in order to stop the rotor as soon as the aircraft has landed.

Thus, as the rotation speed of a helicopter rotor decreases prior to its complete stoppage, the cyclic control making it possible to check the attitude of the rotor disk loses it effectiveness.

Thus, the rotor slowing down and stopping phase should be as short as possible to reduce the risk of a gust of wind tilting the rotor disk without the pilot being able to completely oppose it by a cyclic control and then the blades can strike passengers leaving the aircraft or unwise spectators moving towards it before the rotor has completely stopped. This risk is particularly high in the case of lightweight aircraft, whose rotors are relatively close to the ground. Moreover, once stopped, the rotor must remain in a braked state in order to prevent rotation under the effect of the wind.

The rotor brake of a helicopter is normally located on the transmission system mechanism driving the main rotor or the tail rotor. The control of the brake takes place by means of a handle generally located on the top or roof of the cockpit of the aircraft. The manipulation of said handle must make it possible for the pilot to rapidly stop the rotor without it being necessary to meter the braking of the latter. The pilot must be able to as rapidly as possible free the hand used for manipulating the handle, so as to maintain the rotor in a substantially horizontal plane by means of the cyclic pitch stick, during the stopping of the rotor, his second hand then being occupied by the manipulation of the collective pitch lever.

2. DESCRIPTION OF THE RELATED ART

In order to fulfil this function on lightweight helicopters use is made of an entirely mechanical braking unit by means of which friction linings anchored on a non-rotary support member are applied to a braking disk fixed to a shaft connected to the transmission system mechanism for rotating the helicopter rotors. This mechanism is such that the blocking of the rotor is maintained for as long as the control handle is not brought into its initial state. This mechanical braking unit conventionally has means making it possible to limit the braking force, so as to maintain it at a constant value, as well as restoring means constituted by a spring and by means of which the friction linings are automatically moved away from the disk when the handle is brought into its initial position.

Although such a braking unit is generally satisfactory, it suffers from the disadvantage, due to its totally mechanical nature, of not being able to amplify or increase the force applied by the pilot to the control handle, so that the application force of the friction linings to the disk is low and the stoppage of the rotor does not take place as rapidly as would be wished by the pilot.

Moreover, the use of a hydraulic control, which would make it possible to solve this problem, is considered inappropriate, bearing in mind the frequent installation of the control handle on the roof of the cockpit, where it is not recommended that hydraulic devices be installed due to the risk of oil leaks.

The present invention specifically relates to a gyroplane rotor braking unit making it possible to solve the problems disclosed hereinbefore in connection with the existing, entirely mechanical braking units and which in particular amplifies the braking force applied to the control handle, without having recourse to complex systems such as hydraulic support and without introducing pressurized hydraulics in the vicinity of the control handle.

SUMMARY OF THE INVENTION

According to the invention, this result is obtained by means of a gyroplane rotor braking unit comprising a disk able to rotate with the rotor, at least one friction lining anchored on a non-rotary support member, braking means able to apply the friction lining to at least one face of the disk, a control member located in the gyroplane cockpit and transmission means connecting the control member to the braking means, characterized in that the transmission means are mechanical and that the braking means comprise at least one force amplification hydraulic actuator integrated into said support member.

In this braking unit, the hydraulic actuator advantageously has a motor piston directly connected to the mechanical transmission means, a free piston acting on the friction lining and having a larger, section than that of the motor piston and a control chamber formed in the support member between the motor piston and the free piston.

Preferably, at least one passage connects the control chamber to a hydraulic fluid tank, which can be external of the hydraulic actuator or, conversely, integrated into the support member.

As in the case of existing braking units, force limiting means are advantageously provided between the control member and the friction lining.

In a first embodiment of the invention, these force limiting means are located in the mechanical transmission means and the passage connecting the tank to the control chamber is sealed by the motor piston when the latter is not in the brake release position.

According to a second embodiment of the invention, the force limiting means are integrated into the hydraulic actuator. The passage by which the tank is linked with the control chamber then has a pressure relief valve, whose opening takes place automatically when the pressure in the control chamber reaches a value above an actuating pressure of the force limiting means.

In this case, the force limiting means advantageously have a third piston exposed to the opposing actions of the pressure prevailing in the control chamber and elastic means.

Moreover, in this second embodiment of the invention, the control chamber is also linked with the tank by a second passage normally closed by a check valve allowing a hydraulic fluid passage from the tank into the control chamber when the pressure in the latter drops below a threshold below a predetermined vacuum.

According to a preferred embodiment, the support member is constituted by a fixed bracket over-lapping the disk and the latter is mounted so as to slide along its axis. The bracket then supports a hydraulic actuator, which acts directly on a first friction lining adjacent to a first face of the disk and, via the sliding disk, on a second friction lining adjacent to the second face of the disk.

BRIEF DESCRIPTION OF THE DRAWINGS

The invention is described in greater detail hereinafter relative to two non-limitative embodiments of the invention and with reference to the attached drawings, wherein show.

DETAILED DESCRIPTION OF THE PREFERRED EMBODIMENT

Figure 1:
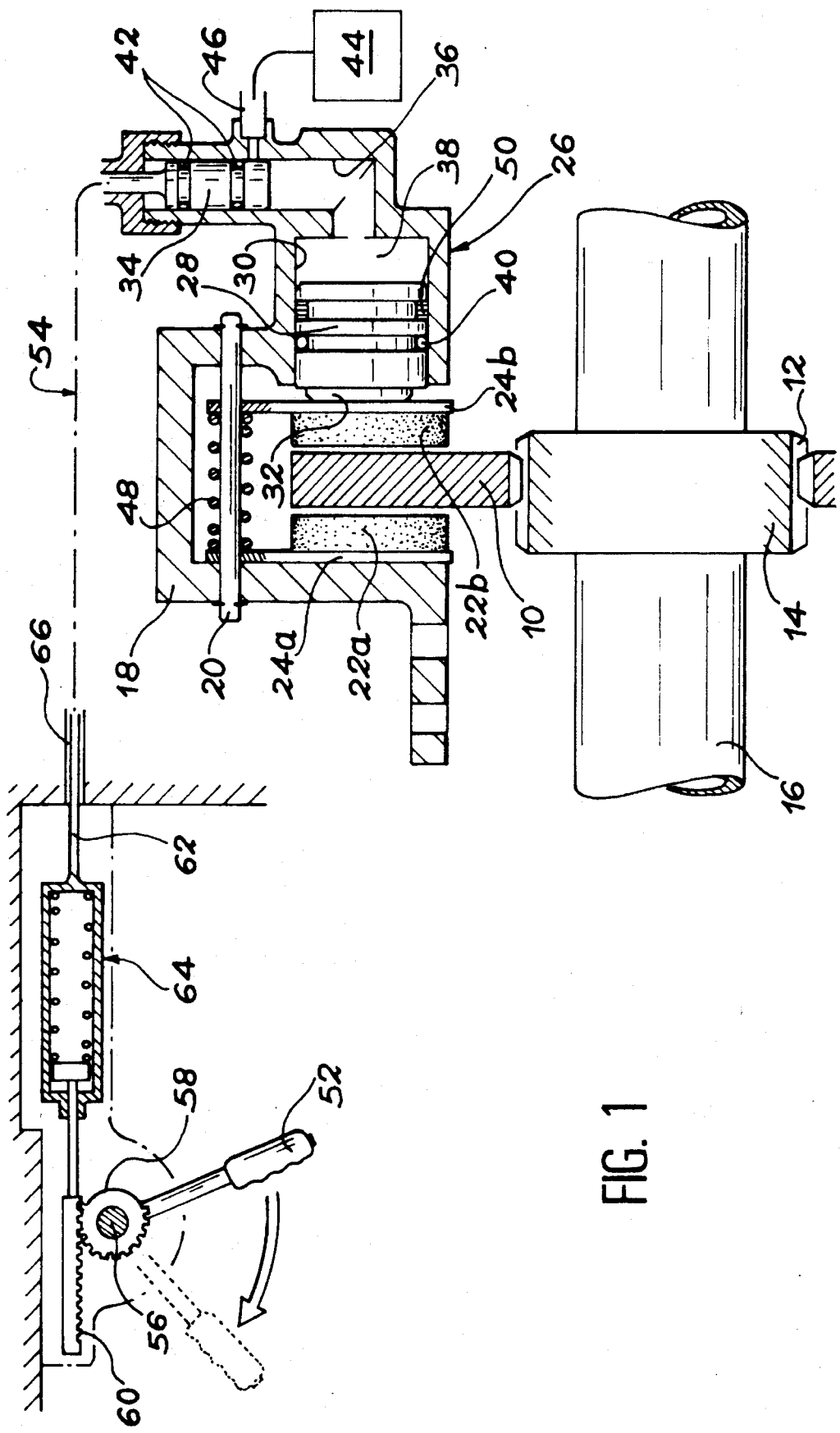
FIG. 1 A part cross-sectional view diagrammatically showing a gyroplane rotor braking unit constructed in accordance with a first embodiment of the invention.

In FIG. 1, reference 10 designates a brake disk, which is mounted on splines 12 formed on a driving flange 14 integral with the shaft 16 forming part of the transmission system mechanism rotating the rotors of a helicopter, e.g. the shaft ensuring the transmission between the main gearbox and the rear rotor of the aircraft. The fitting of the disk 10 on the driving flange 14 by splines 12 has the effect of rendering the disk 10 integral in rotation with the shaft 16 and consequently the helicopter rotors, whilst still allowing a displacement of the disk 10 parallel to the axis of the shaft 16.

Besides the braking disk 10, the braking unit shown in FIG. 1 comprises a support member 18 constituted by a bracket overlapping the disk 10 and fixed to a fixed structure of the helicopter (not shown), e.g. by means of bolts.

In its part located beyond the peripheral edge of the disk, the support member 18 is traversed parallel to the axis of the disk by two pins 20, which support and anchor two friction linings 22a, 22b positioned facing each of the faces of the disk 10. More specifically, each of the friction linings 22a, 22b is carried by a plate 24a, 24b respectively and the pins 20 traverse portions of said plates 24a, 24b located beyond the peripheral edge of the disk 10.

The fixing of the support member 18 to a fixed portion of the helicopter takes place from the side of said member adjacent to the friction lining 22a and a force amplification hydraulic actuator 26 is integrated into the support member 18 from the side adjacent to the friction lining 22b.

More specifically the hydraulic actuator 26 incorporates a free piston 28, which is received in sliding manner in a bore 30 made in the support member 18, along an axis parallel to the axis of the disk 10 and in front of the friction lining 22b. This bore 30 issues on the side of the friction lining 22b, so that the free piston 28 bears on the plate 24b by means of an element 32 made from a thermally insulating material.

The hydraulic actuator 26 also incorporates a motor piston 34, which is received in sliding manner in a second bore 36 made in the support member 18 and linked with the bore 30 in order to form with the latter a control chamber 38. In the embodiment shown in FIG. 1, the bore 36 is oriented according to a direction perpendicular to the axis of the disk 10. However, this orientation is not imperative and the axis of the bore 36 could also be differently oriented, e.g. coaxially to the axis of the bore 30. The section of the motor piston 34 is smaller than that of the free piston 28, so that when the control chamber 38 is filled with hydraulic fluid, any force transmitted to the motor piston 34 is amplified, when it is applied by the hydraulic fluid to the free piston 28.

On its outer surface the free piston has a groove in which is received an annular gasket 40. In a comparable manner, on the outer surface of the motor piston there are two grooves in which are received annular gaskets 42. The gaskets 40 and 42 ensure the insulation of the control chamber 38 with respect to the exterior.

Figure 2:
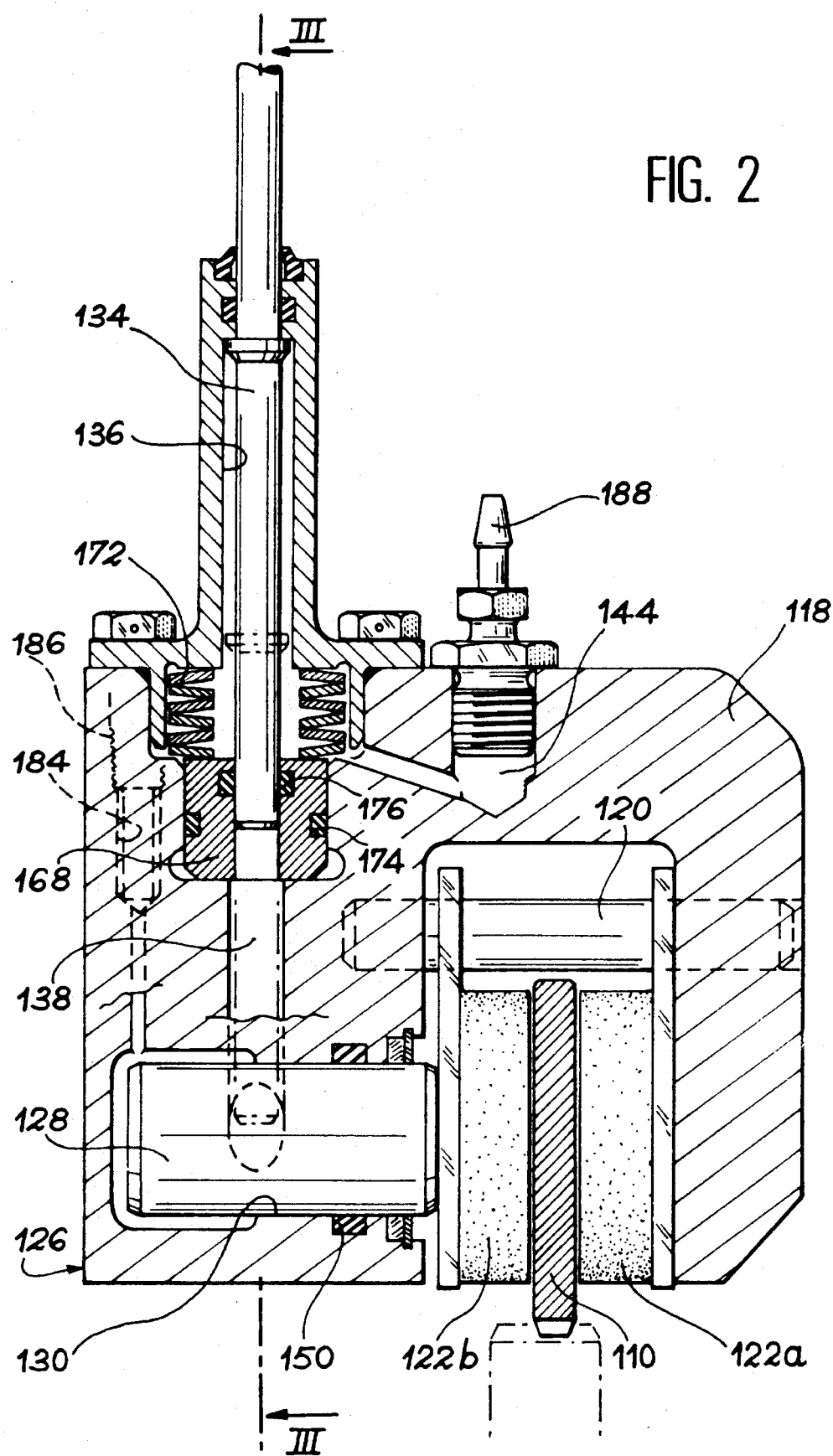
FIG. 2 A cross-sectional view showing the disk brake of a braking unit according to a second embodiment of the invention.

Moreover, the control chamber 38 is linked with a pressurized fluid tank 44 located outside the support member 18 by a passage 46, which issues into the bore 36 at a location in the vicinity of the gasket 42 closest to the control chamber 38, when the motor piston 34 occupies its brake release position illustrated in FIG. 2. Under these conditions, the tank 44 is consequently linked with the control chamber 38. Conversely, any displacement of the motor piston 34 resulting from an actuation of the braking unit has the effect of interrupting the link between the passage 46 and the control chamber 38. The gasket 42 furthest from the control chamber 38 then maintains the seal of the tank 44 with respect to the exterior.

The hydraulic tank 44, whose function is to compensate hydraulic fluid volume variations in the control chamber 38 under the effect of thermal expansion, possible leaks or wear to the friction linings 22a, 22b, can in particular be constituted by the tank of the helicopter hydraulic installation.

In the embodiment illustrated in FIG. 1, a return or restoring spring 48 is mounted on at least one of the pins 20, between the plates 24a and 24b, so as to act on the friction linings 22a, 22b moving them away from one another. Thus, the friction linings 22a, 22b are automatically moved away from the disk 10, when the braking force is released. However, an automatic taking up of the wear of the linings 22a and 22b is then ensured by a means of a locking ring 50 mounted with a certain axial clearance in a groove formed on the outer surface of the free piston 28. This locking ring 50 is in engagement with the inner surface of the bore 30 and has a shape such that it authorizes the displacement of the free piston 28 towards the disk 10, whilst opposing the displacement of the piston 28 in the reverse direction with a force greater than the return force exerted by the spring 48, when the aforementioned axial clearance has been taken up.

In another, not shown embodiment, the return spring 48 and the locking ring 50 are eliminated. In this case, the automatic moving apart of the friction linings 22a, 22b with respect to the disk 10 is obtained as a result of the natural warp of the latter. Thus, there is no need for an automatic taking up of the wear of the friction linings.

The braking unit illustrated in FIG. 1 also comprises a control handle or lever 52 located in the cockpit of a helicopter, usually on its roof, together with completely mechanical transmission means 54 by which a movement of the handle 52 is directly transmitted to the motor piston 34.

More specifically, the control handle 52 is articulated on a spindle 56, so as to be able to pivot by approximately 45° between an inoperative position illustrated in FIG. 1 and a braking unit actuating position. During its tilting, the control handle 52 rotates a pinion 58 meshed on a rack 60 forming one of the ends of the transmission means 54.

The rack 60 is connected to the end of a flexible control member 62, such as a flexible, stainless steel plate, by means of force limiting means 64 constituted by an elastic rod. The flexible control member 62 then travels within a sheath 66 fixed to the helicopter structure, e.g. between two rows of balls according to a known procedure. The opposite end of the flexible control member 62 is fixed directly to the motor piston 34.

The operation of the braking unit described hereinbefore with reference to FIG. 1 will now be explained. In the inoperative state, the different elements constituting the braking unit occupy the positions illustrated in FIG. 1. In particular, the control handle 52 occupies its inoperative position, the two friction linings 22a, 22b are slightly detached from the disk 10 and the control chamber 38 is linked with the tank 44 by the passage 46.

When the pilot operates the control handle 52 to bring it into its braking position, indicated in dotted line form in FIG. 1, the rack 60 drives the flexible control member 62 via force limiting means 64, in such a way that the motor piston 34 moves downwards in the bore 36 with reference to FIG. 1. Under the effect of this displacement the braking force is transmitted to the free piston 28 by the hydraulic fluid contained in the control chamber 38, which is then insulated from the tank 44 by the closing of the passage 46. An effect of amplifying the force exerted on the motor piston 34 is obtained by the section difference between the pistons 34 and 28. Therefore the control handle 52 can be more easily manipulated with a limited force.

The force exerted on the free piston 28 has the effect of applying the friction lining 22b to the facing face of the disk 10 and to make the latter slide along its axis in order to apply its opposite face to the friction lining 22a. Therefore a braking force is obtained, whose value is limited to a given braking torque and force by the force limiting means 64 placed in the mechanical transmission means 54. The locking of the brake leading to the immobilization of the helicopter rotor is maintained for as long as the control handle 52 is in its actuating position.

When the pilot brings the handle 52 into its inoperative position, the motor piston 34 returns to its initial position illustrated in FIG. 1. Thus, a suction effect is brought about in the control chamber 38, which leads to a recoil of the free piston 28 by a value corresponding to the clearance existing between the locking ring 50 and the groove in which said ring is received on the piston 28. The joint spacing of the friction linings 22a, 22b is ensured by the spring 48. Under these inoperative conditions, the connection of the tank 44 to the control chamber 38 makes it possible to automatically compensate any volume variation of the latter.

It should be noted that the manipulation of the control handle 52 is facilitated by the amplification effect obtained as a result of the hydraulic actuator, without any hydraulic fluid being located above the helicopter cockpit. Therefore there are no hydraulic fluid leakage risks in said area.

A second embodiment of the invention will now be described relative to FIGS. 2 and 3. In this second embodiment, identical or comparable elements to those of the first embodiment are designated by the same references, increased by 100.

Figure 3:
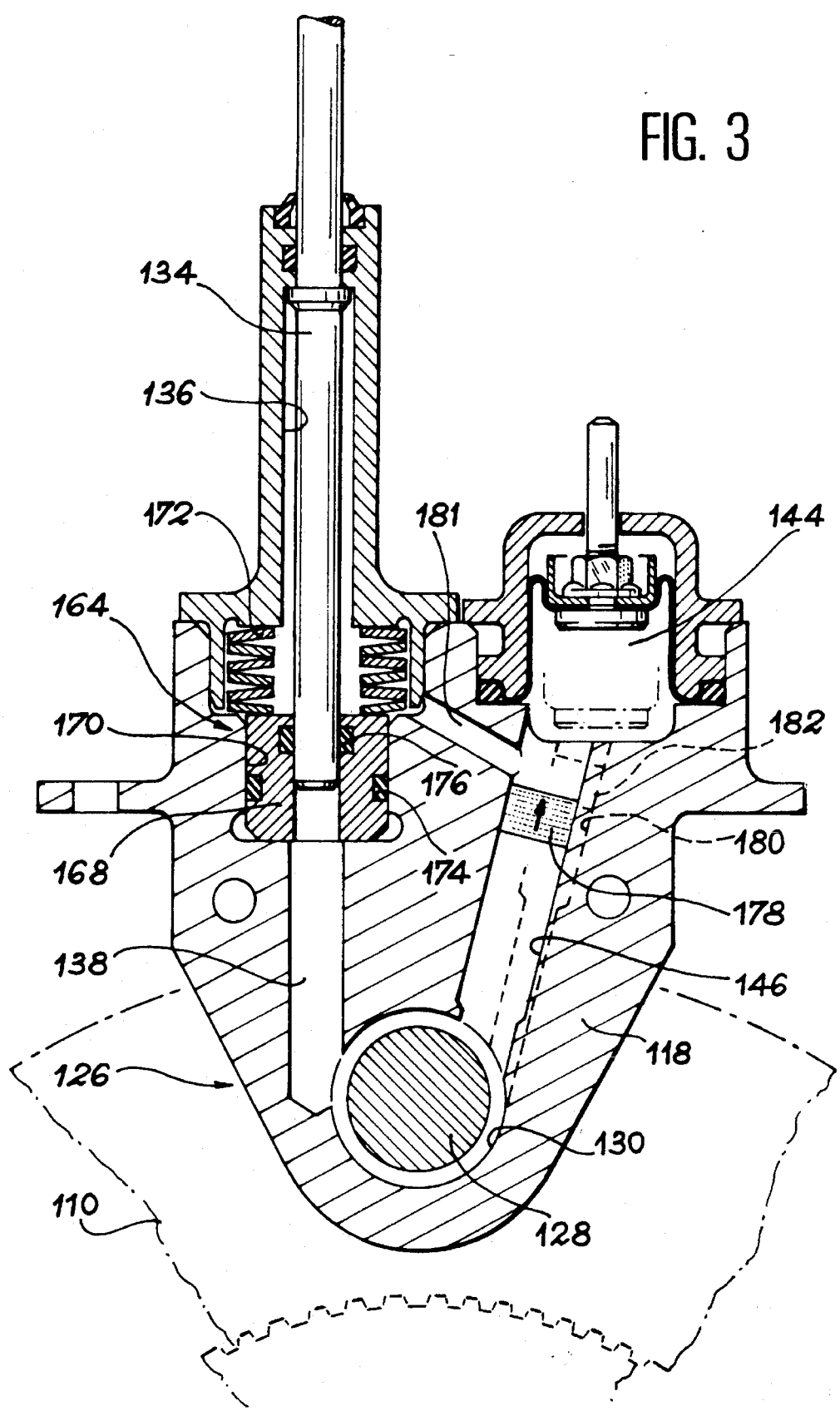
FIG. 3 A sectional view along III—III of FIG. 2.

As in the first embodiment, the braking unit illustrated in FIG. 2 and 3 comprises a disk 110, rotatably connected to a shaft, which is itself integral in rotation with the transmission system mechanism rotating the helicopter rotors, whilst being free to move parallel to its axis. A support member 118 in the form of a bracket is joined to a fixed part of the helicopter and overlaps the disk 110. This support member 118 supports and anchors two friction linings 122a, 122b in front of each of the faces of the disk 110 by means of two pins 120.

In this second embodiment of the invention there is also a force amplification hydraulic actuator 126 integrated into the support member 118 and mainly having a free piston 128 mounted in a bore 130 so as to directly press the friction lining 122b against the adjacent face of the disk 110 and a motor piston 134 received in a bore 136 oriented, as hereinbefore, in a direction perpendicular to that of the bore 130. As is more specifically illustrated in FIG. 3, the bores 130 and 136 are tangential to one another and define between the pistons 128 and 134 a control chamber 138 filled with hydraulic fluid. As in the first embodiment, the section of the free piston 128 is larger than that of the motor piston 134, so as to give the hydraulic actuator 126 an effect of amplifying the force applied to the motor piston 134. The recoil of the free piston 128 is also controlled by a locking ring 150 received with a clearance in a groove formed on said piston.

In FIGS. 2 and 3, the control handle and the mechanical transmission means between the latter and the motor piston 134 are not shown. However, these two elements are identical to those described relative to FIG. 1, with the exception of the force limiting means 164, which are no longer placed on the mechanical transmission means and are instead integrated into the support member 114, like the hydraulic actuator 126.

More specifically, these force limiting means 164 in this case comprise an annular piston 168, received in sliding manner in a bore 170 formed in the support member 118 coaxial to the bore 136. A stack of elastic washers 172 also located in the bore 170 bears both on the annular piston 168 and on the opposite end of the bore 170, in order to normally apply the piston 168 to the end of the bore 170 closest to the control chamber 138, as illustrated in FIGS. 2 and 3.

The sealing of the sliding of the annular piston 168 in the bore 170 is ensured by an annular gasket 174 received in a groove formed on the outer surface of the piston 168. As in also illustrated in FIG. 3, the end of the motor piston 134 turned towards the control chamber 138 is slidingly received in the annular piston 168, no matter what the positions respectively occupied by the pistons 134 and 168. The sealing of this sliding action is ensured by an annular gasket 176 located in a groove formed in the inner surface of the annular piston 168.

The embodiment of FIGS. 2 and 3 also differs from that of FIG. 1 by the fact that the tank 144 is also integrated into the support member 118. In this case, the passage 146 connecting the tank 144 to the control chamber 138 is machined directly in the support member 118 and issues into the bore 130, as illustrated in FIG. 3. The link between the tank 144 and the chamber 138 is controlled by a pressure relief valve 178 located in the passage 146. The opening of said valve 178 intervenes when the pressure in the control chamber 138 exceeds a predetermined value above the pressure causing the recoil of the annular piston 168 in opposition to the action of the elastic washers 172.

As shown in FIG. 3, a second passage 180 is formed parallel to the passage 146 between the tank 144 and the control chamber 138. This passage 180, which also issues into the bore 130, is internally equipped with a check valve 182 for authorizing fluid passage from the tank 144 to the chamber 138, when a vacuum in the latter reaches a predetermined threshold. Moreover, FIG. 3 shows that the tank 144 is permanently linked by a passage 181 with that portion of the bore 170, which contains the stack of elastic washers 172.

To complete the description of the braking unit illustrated in FIGS. 2 and 3, FIG. 3 shows that the control chamber 138 can be linked with the exterior by a passage 184, which is normally sealed by a needle valve 186. In addition, the tank 144 can be linked with the exterior by a bleed screw 188 (FIG. 2), which is normally closed.

The operation of the braking unit described hereinbefore will now be explained. As in the first embodiment of the invention, an actuation of the control handle placed in the helicopter cockpit has the effect of displacing the motor piston 134 in its bore 136 in a downwards direction relative to FIGS. 2 and 3. This displacement is transmitted to the free piston 128 by the hydraulic fluid contained in the chamber 138, so that the friction linings 122a and 122b are applied against the two faces of the disk 110 and brake the rotor.

During this actuating phase, the downward movement of the motor piston 134 continues whilst the braking force is already exerted on the disk 110. Consequently, the pressure in the chamber 138 increases and the annular piston 168 moves upwards in opposition to the action exerted by the spring washers 172.

When the downward travel of the piston 134 continues, whereas the annular piston 168 abuts, the pressure relief valve 178 opens and the excess hydraulic fluid escapes from the control chamber 138 into the tank 144.

The braking unit remains in this state whilst the control handle is maintained in its braking position. Thus, the locking of the rotor is ensured, particularly in the case of wind.

When the control handle is brought into its inoperative position, the motor piston 134 returns to its position illustrated in FIGS. 2 and 3. The annular piston 168, pushed by the spring washers 172, then returns into an abutment position, as illustrated in FIGS. 2 and 3. This movement is accompanied by a recoil of the free piston 128 by the value authorized by the locking ring 150, whose function is comparable to the locking ring 50 in the first embodiment of the invention.

In the final recoil phase of the motor piston 134, the check valve 182 opens and enables the control chamber 138 to fill with hydraulic fluid from the tank 144, in order to compensate the vacuum which then tends to form in the chamber 138.

As has been shown by the previous description, the taking up of the wear of the friction linings 122a and 122b is automatic. Thus, during each braking operation, the total displacement of the free piston 128 is equal to the displacement due to the taking up of the clearance between the disk 110 and the linings 122a and 122b, increased by the displacement corresponding to the wear of the linings and the disk. When the brake is released, the free piston 128 only recoils by the constant clearance between the disk and the linings determined by the locking ring 150. The piston 128 gradually advances during each braking action and the hydraulic fluid volume necessary is supplied by the tank 144 through the check valve 182.

In the first embodiment of the invention, the thermal protection of the hydraulic actuator 26 was ensured by the element 32 interposed between the free piston 28 and the friction lining 22b. A comparable solution could be adopted in the second embodiment. However, in the case illustrated in FIGS. 2 and 3, it is the free piston 128 which is directly made from a thermally insulating material such as a ceramic material.

In order to replace the friction linings 122a and 122b, the brake is removed and the valve 186 is opened so as to permit the recoil of the free piston 128. This operation enables the hydraulic fluid located in the control chamber 138 to return to the tank 144 with a minimum force.

After fitting new linings, the brake is filled with hydraulic fluid by gravity through the hole of the valve 186 after having removed the latter. The bleed screw 188 then enables the air contained in the circuit to escape.

Obviously, the invention is not limited to the embodiments described in exemplified manner hereinbefore and covers all variants thereof. Thus, instead of being supported in mobile manner parallel to its axis, the brake disk can be directly fixed to a shaft connected to the main gearbox of the helicopter. The support member can then either be mounted so as to slide parallel to said axis, or is also fixed, but equipped with two opposite hydraulic actuators located on either side of the disk. In comparable manner, the supporting and anchoring of the friction linings to the support member can be carried out differently.

We claim:

1. A gyroplane rotor braking unit, comprising:

a disk able to rotate with the rotor;

a non-rotary support member adjacent to the disk;

at least one friction lining anchored on said non-rotary support member;

braking means able to apply the friction lining to at least one face of the disk, said braking means comprising at least one force amplification hydraulic actuator integrated into the support member, said hydraulic actuator including a motor piston, a free piston acting on said friction lining and having a section larger than that of the motor piston, and a control chamber formed in the support member between the motor piston and the free piston;

a control member located in a gyroplane cockpit; and mechanical transmission means connecting the control member to the braking means, said transmission means comprising an input member engaged with the control member, a flexible control member received within a sheath fixed to a gyroplane structure and having a first end fixed to the motor piston, and a force limiting means connecting the input member to another end of the flexible control member, whereby the braking force which the friction lining applies to the disk upon actuation of said control member is limited to an upper, predetermined value.

2. The braking unit according to claim 1, wherein the force limiting means comprises an elastic rod.

3. The braking unit according to claim 2, wherein the input member comprises a rack member having an end connected to said other end of the flexible control member via said elastic rod.

4. The braking unit according to claim 1, further comprising a hydraulic fluid tank and at least one passage able to communicate said tank with the control chamber, said passage being sealed by the motor piston when the latter is not in a brake release position.

5. A gyroplane rotor braking unit, comprising:

a disk able to rotate with the rotor;

a non-rotary support member adjacent to the disk;

at least one friction lining anchored on said non-rotary support member;

braking means able to apply the friction lining to at least one face of the disk, said braking means comprising at least one force amplification hydraulic actuator integrated into the support member, said hydraulic actuator including a motor piston, a free piston acting on said friction lining and having a section larger than that of the motor piston, and a control chamber formed in the support member between the motor piston and the free piston;

a control member located in a gyroplane cockpit;

mechanical transmission means connecting the control member to the motor piston of the braking means, and force limiting means integrated into said hydraulic actuator and including a third piston subject to the opposing actions of elastic means and of the pressure prevailing in the control chamber, whereby braking force which the friction lining applies to the disk upon actuation of said control member is limited to an upper, predetermined value.

6. The braking unit according to claim 5, wherein the third piston is an annular piston slidingly received in the support member and on the motor piston.

7. The braking unit according to claim 5, further comprising a hydraulic fluid tank, at least one passage communicating the tank with the control chamber, and a pressure relief valve located in said passage and opening automatically when the pressure in the control chamber reaches a valve above an actuating pression moving the third piston in opposition to the action of the elastic means.

8. The braking unit according the claim 5, further comprising a second passage communicating the tank with the control chamber, and a normally closed check valve, allowing a hydraulic fluid passage from the tank into the control chamber when the pressure in the latter drops below a predetermined vacuum level.

9. Braking unit according to claim 1, wherein a thermally insulating element is interposed between the hydraulic actuator and the friction lining.

10. Braking unit according to claim 1, wherein the free piston is made from a thermally insulating material.

11. Braking unit according to claim 1, wherein the support member is a fixed bracket overlapping the disk, said disk being mounted so as to slide along its axis, the bracket supporting a hydraulic actuator acting directly on a first friction lining adjacent to a first face of the disk and, via the sliding disk, on a second friction lining adjacent to the second face of the disk.

* * * * *